(12) United States Patent
Perocchio et al.

(10) Patent No.: US 11,936,565 B2
(45) Date of Patent: Mar. 19, 2024

(54) METHODS AND APPARATUS FOR DATA TRAFFIC CONTROL IN NETWORKS

(71) Applicant: Telefonaktiebolaget LM Ericsson (publ), Stockholm (SE)

(72) Inventors: Carlo Giovanni Perocchio, Genoa (IT); Manuela Scarella, Genoa (IT); Marco Marchesini, Genoa (IT); Francesco Lazzeri, Genoa (IT)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 302 days.

(21) Appl. No.: 17/288,284

(22) PCT Filed: Nov. 2, 2018

(86) PCT No.: PCT/EP2018/080038
§ 371 (c)(1),
(2) Date: Apr. 23, 2021

(87) PCT Pub. No.: WO2020/088779
PCT Pub. Date: May 7, 2020

(65) Prior Publication Data
US 2021/0392082 A1 Dec. 16, 2021

(51) Int. Cl.
*H04L 12/851* (2013.01)
*H04L 12/24* (2006.01)
(Continued)

(52) U.S. Cl.
CPC .............. *H04L 47/24* (2013.01); *H04L 41/12* (2013.01); *H04L 47/82* (2013.01)

(58) Field of Classification Search
CPC .......... H04L 47/24; H04L 41/12; H04L 47/82
(Continued)

(56) References Cited

U.S. PATENT DOCUMENTS

2010/0325637 A1* 12/2010 Radmilac .............. G06F 9/5083
718/104
2017/0317780 A1* 11/2017 Wood ................... H04J 14/0267
(Continued)

FOREIGN PATENT DOCUMENTS

CN 108540404 A * 9/2018 ......... H04L 47/6235
EP 3041168 A1 7/2016

OTHER PUBLICATIONS

International Search Report and Written Opinion dated Apr. 3, 2019 for International Application No. PCT/EP2018/080038 filed Nov. 2, 2018, consisting of 10-pages.
(Continued)

*Primary Examiner* — Faisal Choudhury
(74) *Attorney, Agent, or Firm* — Christopher & Weisberg, P.A.

(57) ABSTRACT

Aspects of embodiments provide methods and network criticality managers for controlling data traffic in a network. The method may include: obtaining network topology information from a plurality of physical resources used to transfer data traffic in the network; determining priority levels for data traffic in the network; using the network topology information and the determined priority levels to calculate criticality values for physical resources from among the plurality of physical resources, wherein the criticality values for the physical resources indicate the relative importance of the physical resources in the network; and controlling the data traffic in the network based on the calculated criticality values.

20 Claims, 16 Drawing Sheets

(51) Int. Cl.
*H04L 41/12* (2022.01)
*H04L 47/24* (2022.01)
*H04L 47/70* (2022.01)

(58) Field of Classification Search
USPC .......................................................... 370/235
See application file for complete search history.

(56) References Cited

U.S. PATENT DOCUMENTS

2019/0138359 A1* 5/2019 Rangarajan ........... G06F 9/5027
2019/0327738 A1* 10/2019 Torres ............... H04W 72/0453
2021/0092640 A1* 3/2021 Ravishankar ..... H04W 28/0268

OTHER PUBLICATIONS

Y. Lee et al.; A Yang Data Model for ACTN VN Operation; TEAS Working Group Internet Draft; IETF Trust; May 29, 2018, consisting of 53-pages.
Daniele Ceccarelli et al.; Framework for Abstraction and Control of Traffic Engineered Networks; TEAS Working Group Internet Draft; IETF Trust; Jul. 20, 2017, consisting of 46-pages.

* cited by examiner

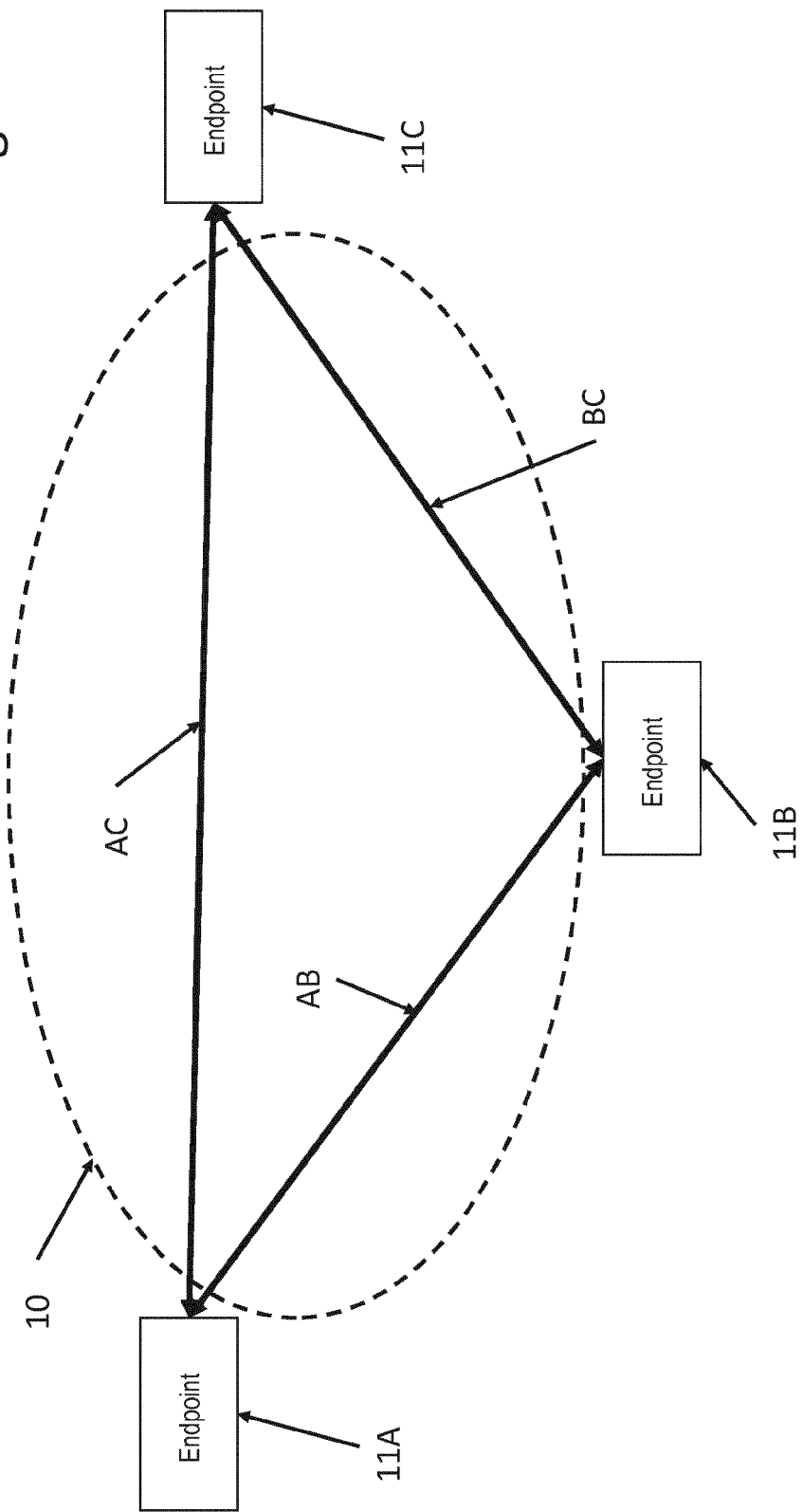

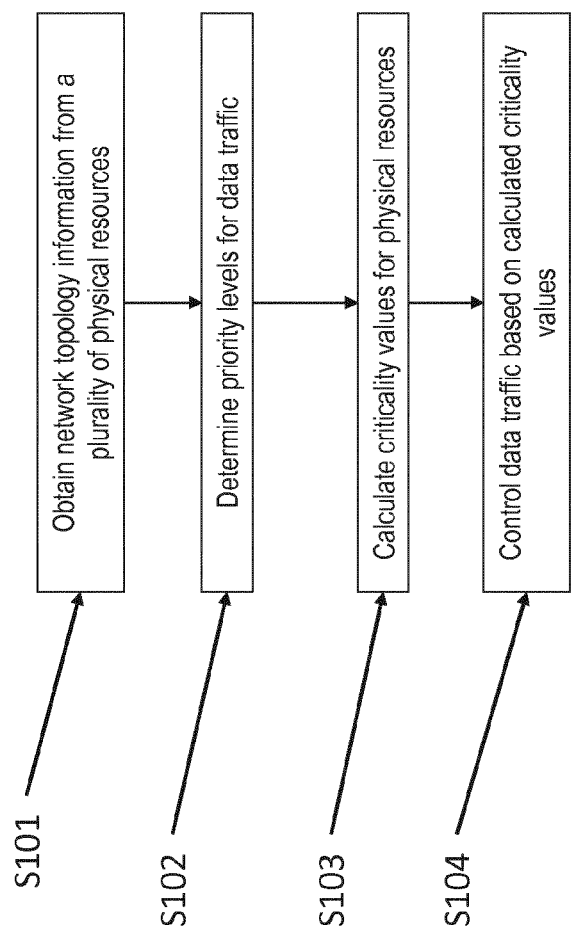

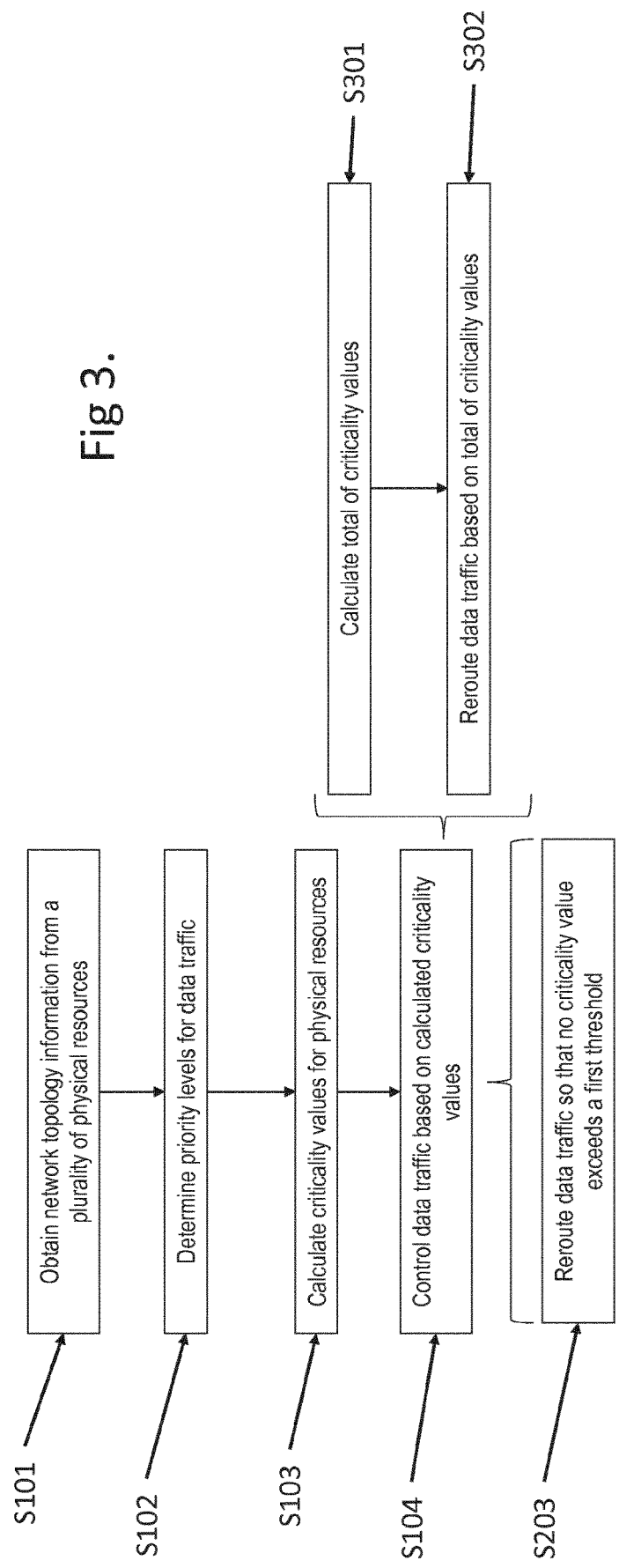

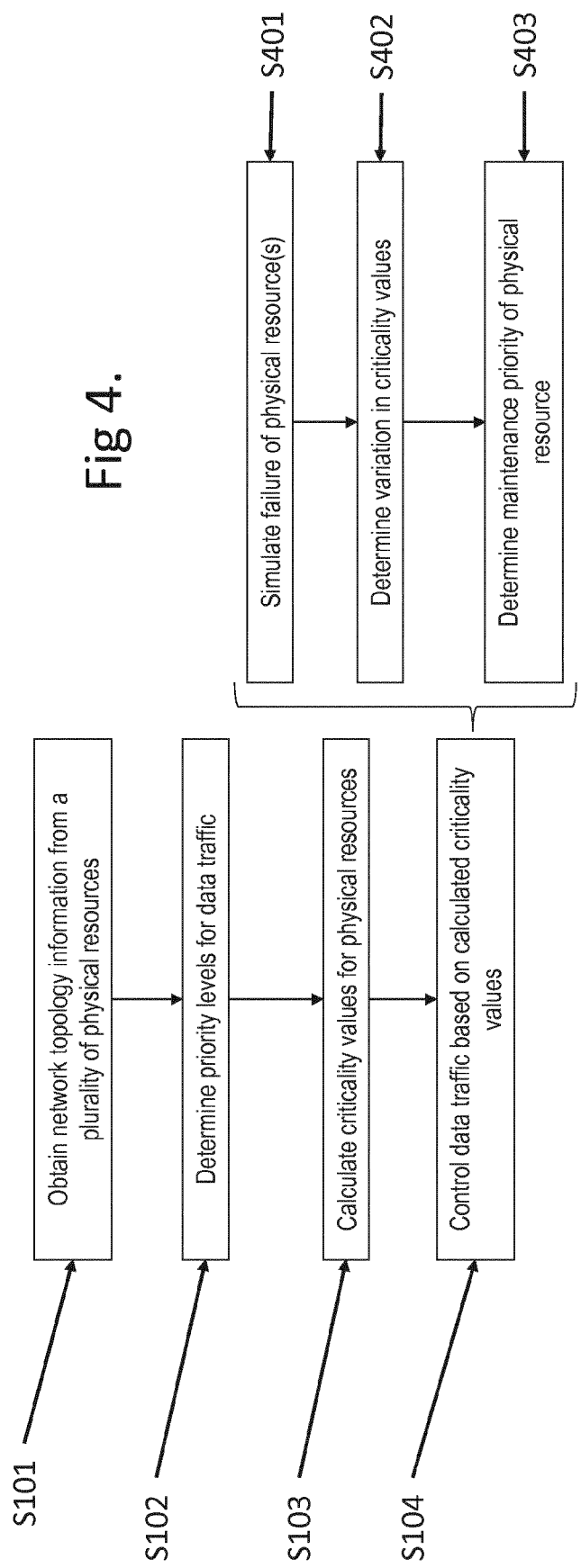

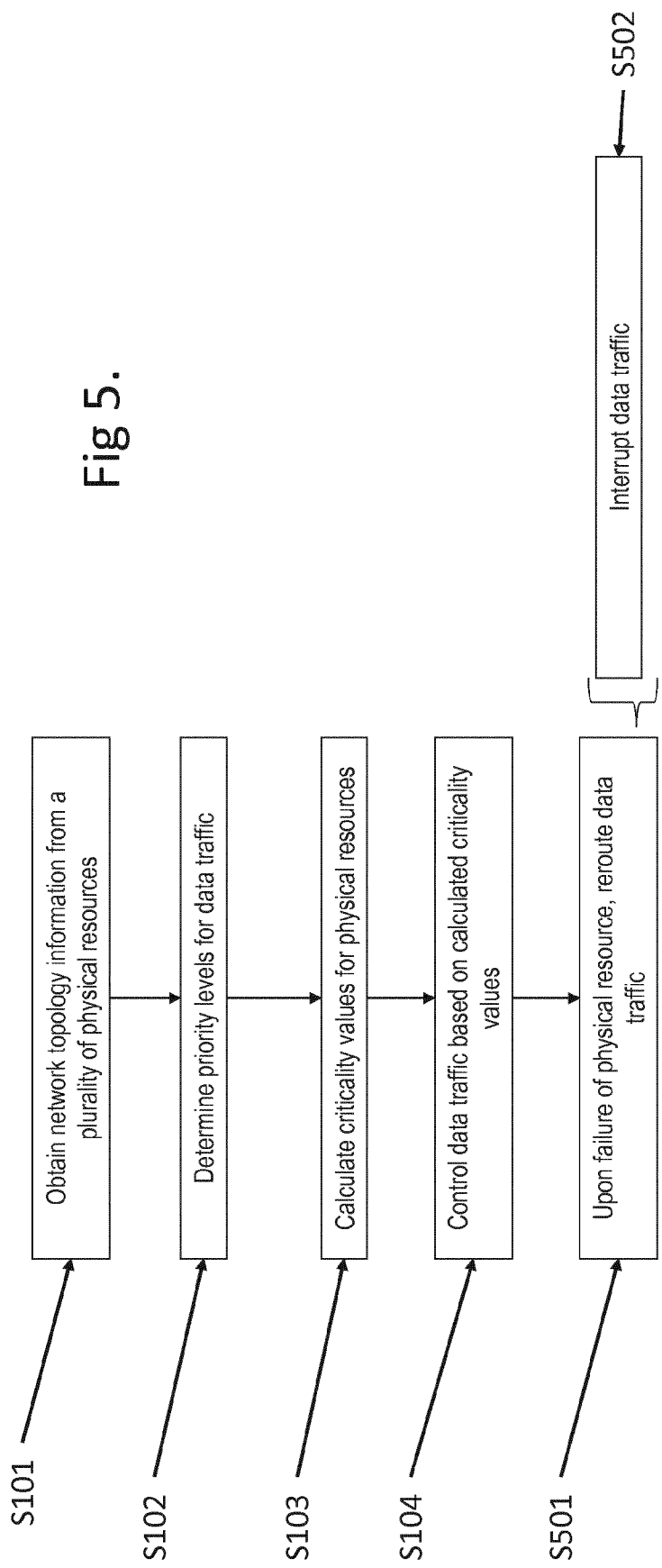

METHODS AND APPARATUS FOR DATA TRAFFIC CONTROL IN NETWORKS

CROSS-REFERENCE TO RELATED APPLICATIONS

This application is a Submission Under 35 U.S.C. § 371 for U.S. National Stage Patent Application of International Application Number: PCT/EP2018/080038, filed Nov. 2, 2018 entitled "METHODS AND APPARATUS FOR DATA TRAFFIC CONTROL IN NETWORKS," the entirety of which is incorporated herein by reference.

TECHNICAL FIELD

Embodiments of the present disclosure relate to methods and apparatus in networks, and particularly methods and apparatus for controlling the flow of data traffic in networks.

BACKGROUND

With recent advances in network operation technology, such as increases in the use of Software Defined Networks (SDN), the responsiveness of networks to changes in demand or transmission issues has necessarily increased. SDNs essentially decouple the network control functions (the control plane) from the data forwarding functions (the data plane), introducing a degree of separation between control of the physical components forming the network infrastructure (nodes, cables, etc.) and the overall network control. In SDN, data transfer services can be used to provide a user with a data connection between two points, without requiring the user to have detailed knowledge of exactly which physical components of the network are responsible for providing the connection. As such, a data transfer service can be used to satisfy the data traffic requirements of a user, such as transferring a given volume of data traffic between two points at a given rate, with a given reliability, and so on.

A discussion of potential frameworks for the separation of the data plane and the control plane in SDNs is provided in "Framework for Abstraction and Control of Traffic Engineered Networks", by TEAS Working Group, Internet Engineering Task Force, available at https://tools.ietf.org/html/draft-ietf-teas-actn-framework-07 as of 12 Oct. 2018.

The separation of the data and control planes allows SDN to respond more quickly to changes in the network status than networks without the same degree of separation between data and control planes. However, even in networks without the plane separation, the ability to redirect data traffic dynamically and thereby make full use of the plurality of route options is key to fully exploiting the network capabilities.

The use of SDNs and complex non-software defined networks is expected to increase with the growth of cloud computing and, in particular, dynamic provisioning of resources which allows users to be allocated computing resources (such as server space) as required on an ad hoc basis. Also pushing the demand for increased network flexibility is the increase in peer to peer data transfer. Historically, data has predominantly flowed between a user and a server (or "vertically"), rather than directly between users (or "horizontally").

In addition to increasing the flexibility with which data transfer services may be provided, advances in networking technology (including SDN) provide increases in the efficiency of deployed network infrastructure. The technological advances may reduce the cost of operation and reduce the time-to-market of introducing a new service, by increasing the level of automation on the control and configuration of the network infrastructure. With the introduction of ACTN (Abstraction and Control of Traffic-Engineered Networks) and the related concept of VN (Virtual Networks) the automation and the dynamicity of the provisioning is extended to the virtual network, wherein the set of exchange to exchange (E2E) tunnels (or routes) provide clients with a virtual full meshed infrastructure.

As networks increase in scale and complexity, it becomes increasingly vital to take into consideration on what basis the flow of data within the network is controlled. The numerous interconnections (that is, data connections, in the form of wired links, wireless links, and so on) between network nodes within a network typically mean that a plurality of different routes may be taken between any two given points in the network. The selection of which of a plurality of route options should be used for given data traffic at a given time determines the flow of data through a network.

Typically, where a plurality of route options are available, the flow of data through a network is controlled based on traffic-engineering constraints. The traffic-engineering constraints can include minimising lag, minimising a number of hops between endpoints (where endpoints are the points where data enters and exits the network), using connections having sufficient available bandwidth, and so on. The traffic-engineering constraints can be monitored through use of appropriate metrics, which represent physical attributes of the network resources, like available bandwidth, number of hops, and latency, or logical attributes, like preference to use a single connection for a group of linked data transfer services, and so on.

In FIG. 1A a schematic diagram of a network is shown. For ease of understanding, the network shown schematically in FIG. 1A has been significantly simplified relative to a real world network. The schematic in FIG. 1A does not show the individual physical resources used to form connections between the endpoints; instead the collective physical resources 10 are shown. For clarity, the endpoints 11A, 11B and 11C are shown separately from the collective physical resources 10, although the endpoints would form part of the collective physical resources of the network. Between the endpoints 11A, 11B and 11C are the routes AB, AC and BC, where route AB is the data traffic route between endpoints 11A and 11B, and so on.

Traffic-engineering constraints may be used to compute paths and determine data traffic routes (also referred to as "tunnels") for data traffic between the end points on the physical network. The use of traffic-engineering constraints to plot the data traffic routes should ensure that, at the time of computation, the data traffic routes have sufficient capability to cope with the demands of data transfer services using the routes. Using traffic-engineering constraints, efficient data traffic routes can be established between the endpoints in the network. With the example network shown schematically in FIG. 1A, if traffic-engineering constraints were used to determine the routes to be used between endpoints 11A and 11C, it is likely that most or all of the data traffic would use route AC (assuming this route has sufficient capacity). This is because route AC is likely to require fewer hops than the alternative route AB-BC, that is, a combination of route AB and route BC.

In general, metrics (used to monitor traffic-engineering constraints) are assigned in a static way by the system administrator to represent physical attributes of the network resources such as bandwidth capabilities, as discussed above. Although metrics may be managed and modified as needed, for example on modification of a physical resource, the metrics generally do not promptly indicate variations in the status of the network. This applies to both normal and SDN networks. Path computation on typical virtual-networks keeps into account only static metrics and traffic-engineering constraints. It is not feasible to efficiently retrieve from the network topology the risk associated to the failure of the deployed network physical resources (nodes, link, interfaces).

FIG. 1B shows the example network of FIG. 1A in greater detail, such that some of the physical components used to form the routes between the endpoints are also shown. The nodes forming part of network may also be referred to as provider edges (PE); the nodes are typically linked to other nodes all under the control of the network provider. This is as distinguished from customer edges (CE), which are interfaces between the network and other systems, such as user systems or other networks. Two sub-networks are used to form the example network in FIG. 1B, these are labelled N1 and N2. Sub-network N1 shows the paths of the physical connections between the PEs, which are labelled h, r, s, t, v, w, x, y, z in FIG. 1B. Further, the interface link between the two sub-networks is labelled i. Sub-network N2 shows the virtual connections between the PE connected to sub-network N1 (that is, the PE at which link i terminates) and the PEs connected to the CEs; these virtual connections are labelled q and u in FIG. 1B. Traffic engineering type monitoring of the FIG. 1B configuration may comprise, for example: monitoring the total bandwidth over a single link (such as link y) from all data using this link; monitoring all traffic passing through a given PE (such as the PE at which link i terminates in N2 as discussed above); and monitoring all traffic passing through a virtual link (such as u).

SUMMARY

It is an object of the present disclosure to facilitate calculation of the importance of the physical resources forming the network topology, to allow the control of data traffic within a network in such a way as to minimise the impact of any interruptions in data traffic flow.

Embodiments of the disclosure aim to provide methods and network criticality managers that alleviate some or all of the problems identified above.

An aspect of the disclosure provides a method for data traffic control in a network, the method comprising: obtaining network topology information from a plurality of physical resources used to transfer data traffic in the network; determining priority levels for data traffic in the network; using the network topology information and the determined priority levels to calculate criticality values for physical resources from among the plurality of physical resources, wherein the criticality values for the physical resources indicate the relative importance of the physical resources in the network; and controlling the data traffic in the network based on the calculated criticality values. In this way, the data traffic in the network can be effectively evaluated and controlled in such a way as to minimise the impact of the failure of any physical resources, and can also take into consideration the priorities of different data traffic when controlling data traffic to minimise data interruptions.

The step of controlling the data traffic may comprise: calculating a total of the criticality values for the plurality of physical resources; and routing or rerouting data traffic based on the total of the criticality values for the plurality of physical resources. The step of controlling the data traffic may additionally or alternatively comprise rerouting data traffic such that none of the criticality values exceed a first predetermined threshold. In this way, the risk of data loss and the consequences of a physical resource failure may be reduced.

The criticality value for a given physical resource may be calculated using a reliability value of the given physical resource, such that the probability of a fault is a factor in determining the criticality value for the given physical resource and a more useful criticality value is obtained.

The criticality value for a given physical resource from among the plurality of physical resources may be used to determine a maintenance priority of the given physical resource, thereby allowing maintenance work to be targeted to the physical resources where the most benefit may be provided.

One or more failures of physical resources from among the plurality of physical resources may be simulated, and any variation in the criticality values of the other physical resources from among the plurality of physical resources due to the simulated failures may be determined, wherein the variation in the criticality values may be used when determining the maintenance priority of at least one of the physical resources from among the plurality of physical resources. In this way, future potential issues and network weaknesses may be identified. In particular, at least two concurrent failures of physical resources may be simulated.

The step of controlling the data traffic may comprise suspending physical resources from among the plurality of physical resources having a criticality value below a second predetermined threshold. In this way, physical resource operational lifetime may be increased and the network efficiency improved.

In the event of a failure of one or more of the plural physical resources, data traffic may be rerouted using other physical resources while minimising a total of the criticality values for the plural physical resources except for the one or more failed physical resources. In this way, interruptions in data traffic may be minimised, both for the existing network configuration and in the case of further physical resource failures.

The criticality values may be recalculated following at least one of the replacement, modification and removal of one of the plurality of physical resources, and the addition of new physical resources. In this way, accurate and up to date information on the network status may be obtained.

Quality of service metrics may be calculated for routing the data traffic, and the data traffic in the network may be controlled based on a combination of the calculated criticality values and the quality of service metrics. In this way, the risk of data interruptions may be reduced while maintaining network efficiency.

A further aspect of the disclosure provides a network criticality manager configured to control data traffic in a network, the network criticality manager comprising processing circuitry and a non-transitory machine-readable medium storing instructions, wherein the network criticality manager is configured to: obtain network topology information from a plurality of physical resources used to transfer data traffic in the network; determine priority levels for data traffic in the network; calculate criticality values for physical resources from among the plurality of physical resources using the network topology information and the determined priority levels, wherein the criticality values for the physical resources indicate the relative importance of the physical resources in the network to minimising data traffic interruptions in the network; and control the data traffic in the network based on the calculated criticality values. The network criticality manager may be configured to provide the same benefits as discussed above in the context of the methods.

Further aspects provide apparatuses and computer-readable media comprising instructions for performing the methods set out above.

BRIEF DESCRIPTION OF DRAWINGS

For a better understanding of the present disclosure, and to show how it may be put into effect, reference will now be made, by way of example only, to the accompanying drawings, in which:

FIG. 1A is a schematic diagram of a network;

FIG. 1C is a flowchart illustrating a method in accordance with an aspect of an embodiment;

FIG. 3 is a flowchart illustrating a further method in accordance with an aspect of an embodiment;

FIG. 4 is a flowchart illustrating a further method in accordance with an aspect of an embodiment;

FIG. 5 is a flowchart illustrating a further method in accordance with an aspect of an embodiment;

DETAILED DESCRIPTION

Figure 1B:
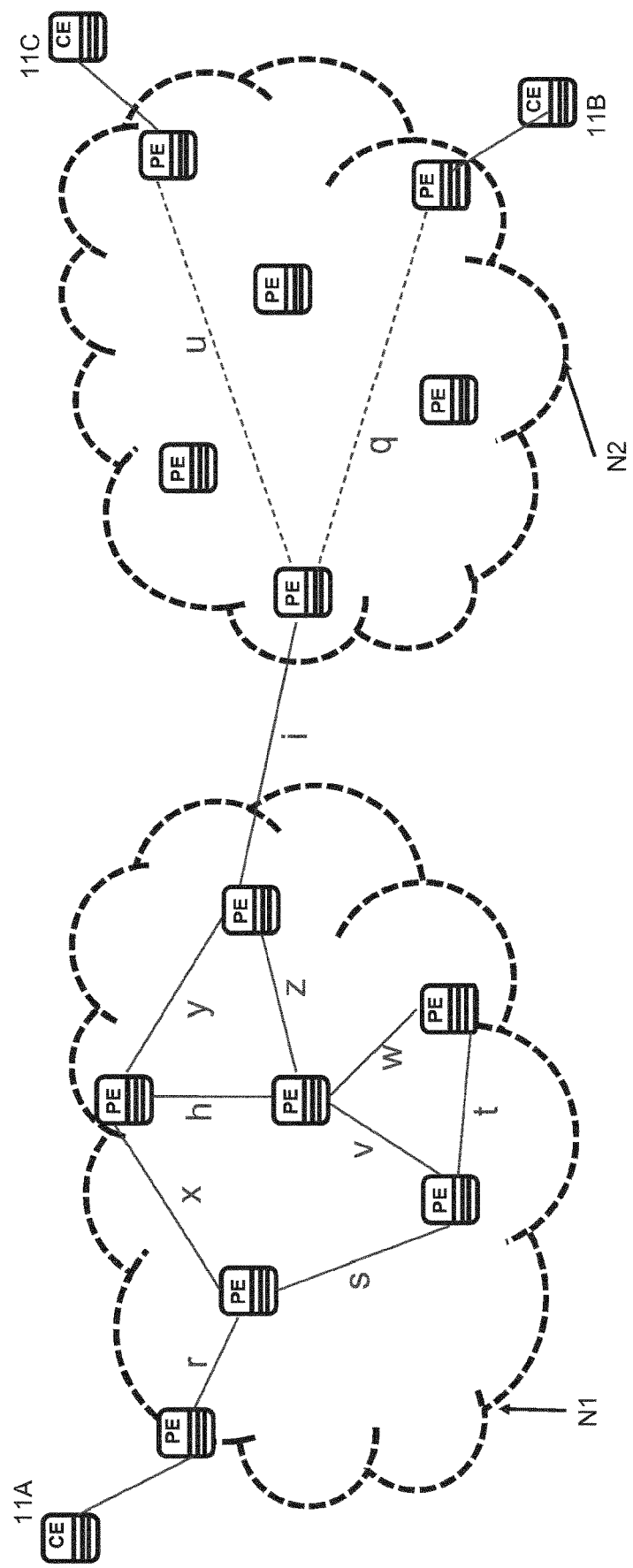
FIG. 1B is a more detailed schematic diagram of the network of FIG. 1A.

The following sets forth specific details, such as particular embodiments for purposes of explanation and not limitation. It will be appreciated by one skilled in the art that other embodiments may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers that are specially adapted to carry out the processing disclosed herein, based on the execution of such programs. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing modules or one or more controllers, and the terms computer, processor, processing module and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Where the routes through a network are determined based on traffic-engineering constraints, it is common for a number of data transfer services between two given endpoints (where the different data transfer services may be satisfying data transfer requirements of different network users) to all transfer data traffic using the most efficient route between these endpoints, that is, to all operate using the same physical resources (as discussed above with reference to FIG. 1A). When the most efficient route reaches data capacity, further data traffic would then be sent using the second most efficient route, and so on. Where traffic-engineering constraints alone dictate data traffic routes there exists a risk that, in the event of a failure of a physical resource on a heavily used route (such as the most, or one of the most, efficient route(s)) a large amount of data may be delayed or lost. With reference to the schematic in FIG. 1A, if a physical resource used in route AC were to fail and all of the data traffic between endpoints 11A and 11C used this route, large amounts of data could be delayed or lost.

Also, in current networks, it can be difficult to obtain feedback to drive network infrastructure design using live information from the network itself: additional expert analysis is required that may be expensive and time-consuming; for example, performance data collection may be required on a traffic class basis or a campaign to analyse traffic with packet-sniffer may be carried out.

There is no capability in existing networks (including SDN) to take into account the criticality of the various physical resources forming the network topology when determining the data traffic routes to be used. It is accordingly not possible to optimize networks in order not to exceed a given risk threshold, either upon initiation or as soon as new services are introduced or existing services get modified (due to re-routing, re-optimization, or removal).

FIG. 1C shows a method for data control in accordance with the present disclosure. The method may be performed by any suitable apparatus, and is applicable to both software defined networks (including using VNs) and other (not software defined) networks. An example of a suitable apparatus for performing the method shown in FIG. 1C is the network criticality manager 20A shown schematically in FIG. 2A. The network criticality manager 20A as shown in FIG. 2A may execute steps of the method in accordance with a computer program stored in a memory 22, executed by a processor 21 in conjunction with one or more interfaces 23. The network criticality manager 20A may also be configured to execute the steps of other aspects of embodiments, as discussed in detail below.

The method shown in FIG. 1C utilises knowledge of the network topology, that is, the arrangement of physical components (links, nodes, interfaces, etc.) that are used to transfer data traffic in the network. As such, the method requires that knowledge of the network topology information be obtained (see step S101 in FIG. 1C). Some of this information may potentially be obtainable from metrics typically used in network control, as discussed above, for example, knowledge of the connections between nodes.

Where the method is performed by a network criticality manager, the network criticality manager may obtain the network topology information by directly querying each of the nodes to determine connections between nodes. The nodes forming part of network may also be referred to as provider edges; the nodes are typically linked to other nodes all under the control of the network provider. This is as distinguished from customer edges, which are interfaces between the network and other systems, such as user systems or other networks. Alternatively or additionally, Physical Network Controllers (PNC) which embody a control layer may collate information relating to the portion of the network under their control, and this information may then be forwarded to the network criticality manager. In some aspects of embodiments a Multi Domain Service Controller (MDSC) may be present. One or more MDSCs can form a coordination layer, sending commands to a control layer (e.g. comprising PNCs) which, in turn, can control the physical layer. Due to the coordination role fulfilled by MDSCs, efficient locations for network criticality managers include either forming part of a MDSC, or connected to a MDSC. Features of the disclosure may be implemented by a hierarchical SDN network, e.g. implemented by a MDSC and one or more PNCs. Alternatively, any method of network control, e.g. any form of SDN or other technologies may be utilized. An example of a hierarchical SDN network which may implement the disclosure is shown in FIG. 1D. The example network shown in FIG. 1D is an Abstraction and Control of Traffic-Engineered Network (ACTN), which allows the management of a virtual network between endpoints that is implemented using a group of physical connections. The ACTN comprises a coordination layer (implemented using a MDSC), which coordinates the actions of a plurality of PNCs forming a control layer. The PNCs in turn can control the physical layer.

The network criticality manager can be used by the MDSC when determining how to command the control layer. In aspects of embodiments the network criticality manager can be realised using physical components, or implemented as a software module, or a combination of software and physical components. The network criticality manager 20A shown in FIG. 2A may be incorporated within, or connected to, an MDSC.

Figure 2A:
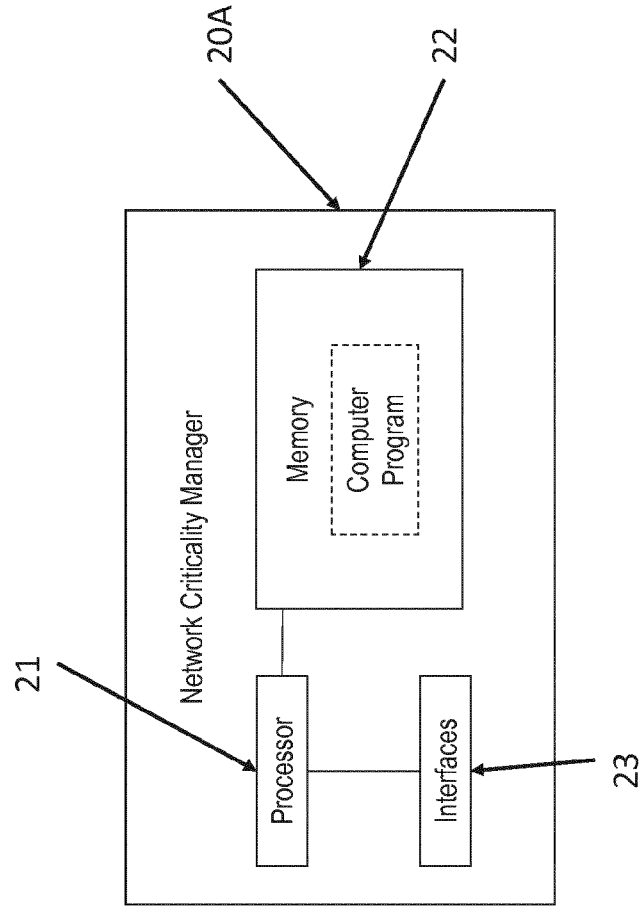
FIG. 2A is a schematic diagram of a network criticality manager in accordance with an aspect of an embodiment.
Figure 2B:
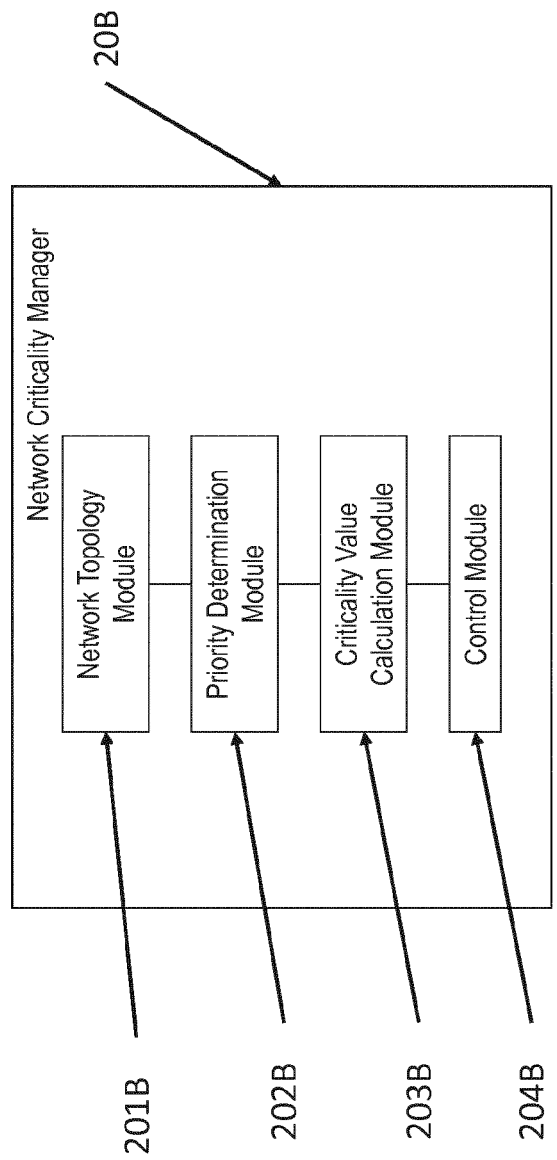
FIG. 2B is a schematic diagram of a further network criticality manager in accordance with an aspect of an embodiment.

A further example of an apparatus for performing the method shown in FIG. 1C is the network criticality manager 20B shown schematically in FIG. 2B. The network criticality manager 20B of FIG. 2B comprises a network topology module 201B, a priority determination module 202B, a criticality value calculation module 203B and a control module 204B, and is configured to implement data traffic control in a network. The network topology module 201B is configured to obtain network topology information from a plurality of physical resources used to transfer data traffic in the network. The priority determination module 202B is configured to determining priority levels for data traffic in the network. Information from both the network topology module 201B and the priority determination module 202B is passed to the criticality value calculation module 203B, which uses the network topology information and the determined priority levels to calculate criticality values for physical resources from among the plurality of physical resources, wherein the criticality values for the physical resources indicate the relative importance of the physical resources in the network to minimising data traffic interruptions in the network. Based on these determined criticality values, the control module 204B is configured to control the data traffic in the network. The network criticality manager 20B may also be configured to execute the steps of other aspects of embodiments, as discussed below and above. The network criticality manager 20B may also be incorporated within, or connected to, an MDSC.

The network topology information details the physical layout of the network, detailing the interconnections between nodes, the data capacities of different components, where interfaces between the network and other components (such as other networks, user connections, etc.) are located, and so on. Using this information, a topographical map of the components used to transfer data traffic can be formed.

Figure 2C:
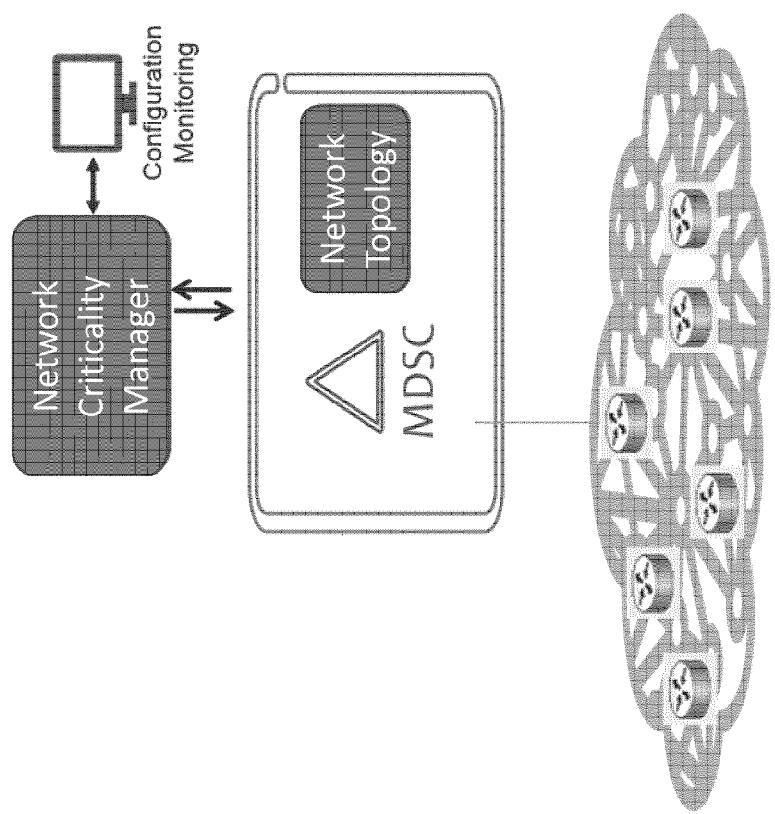
FIG. 2C is a schematic diagram of a network criticality manager connected to an MDSC in accordance with an aspect of an embodiment.

An example of an embodiment wherein the network criticality manager is connected to an MDSC (in an ACTN) is shown in FIG. 2C. The network criticality manager shown in the example of FIG. 2C (which may be the network criticality manger of either of FIGS. 2A and 2B) is separate from, but connected to, the MDSC. For simplicity the arrangement of network components below the coordination layer (so, below the MDSC) is not shown in detail in FIG. 2C. In the example shown in FIG. 2C, the network topology information is collated, from the various network components, in the MDSC, before being used by the network criticality manager connected to the MDSC. The example shown in FIG. 2C also includes systems for monitoring the flow of data traffic through the network; using a configuration monitoring system connected to the network criticality manager. The monitoring and readout of information from the network criticality manager is discussed in greater detail below.

The primary purpose of the network is to carry data traffic. Control of the transport of data within the network may be managed using data transfer services. Typically use of the network by user is regulated with reference to these data transfer services. That is, a user arranges (typically purchases) use of the network for data traffic, with conditions such as the ability to transport a certain amount of data, at a certain transfer rate, and then a data transfer service is provided to oversee the data traffic requirements of the user.

Data traffic for different users, or different types of data traffic for one user, may be subject to different requirements. The requirements may include the time taken to transfer the data, the tolerance for failures in transmissions when sending the data, and so on. In terms of the time to transfer, some data (such as video call data) may be time critical, while other data (such as data backups to remote servers) may be less time critical. As for the failure tolerance, some data (such as that of domestic users) may be viewed as having a high failure tolerance, while data relating to financial transactions sent between banks may be viewed as having a low failure tolerance. Data traffic for different data transfer services may be given different priorities, based on different the requirements for the data transfer services as discussed above. Typically a network will be used to carry data traffic relating to a large number of different data transfer services, thereby carrying data having different priority levels; in step S102 of FIG. 1C the respective priority levels for the data traffic using the network are determined.

Once the priority levels of the data traffic have been determined, this information is used in conjunction with the network topology information obtained in step S101 to calculate criticality values for at least some of the physical resources among the plurality of physical resources (see step S103). The physical resources in this context may include physical layer components such as network nodes, interfaces, wired or wireless links between nodes, and so on, and may also include control level components such as PNCs. Criticality values may be calculated for each of the physical resources, or for a subset of the physical resources. In some aspects of embodiments, a single criticality value may be used for plural components, for example, a network node and the cables attached to the network node.

The criticality value of a given physical resource is determined by factors including the priority levels of the data traffic that uses the physical resource, the availability of alternative routes using different physical resources should the given physical resource fail, and so on. Essentially, the criticality values for physical resources are indicators of the relative importance of the physical resources in the network to minimising data traffic interruptions in the network. The criticality value(s) of a physical resource may be proportional to the priority of data traffic using that physical resource. In some aspects, the criticality value(s) of a physical resource may be inversely proportional to the number of alternative routes not using the physical resource which could be used to send the data traffic, and so on. As such, the importance of a physical resource (i.e. criticality value) is based on one or more factors including: the priority of data traffic carried by the physical resource, the amount of data traffic carried by the physical resource, the effect (e.g. amount of congestion) caused by rerouting the data traffic in the event of failure of the physical resource, availability of alternative routes, a predicted failure rate (e.g. MTTF) and/or a predicted time to repair (e.g. MTTR).

In aspects of embodiments each physical resource may be assigned a single criticality value, which may take into consideration a number of factors as discussed above. In alternative aspects of embodiments, each physical resource may be assigned multiple criticality values representing different aspects of the criticality of the resource, including risk of failure, number of services carried, and so on. Criticality values may be calculated for each of the plurality of physical resources used to transfer data traffic in the network, thereby maximising the effectiveness of the data traffic control.

Figure 1D:
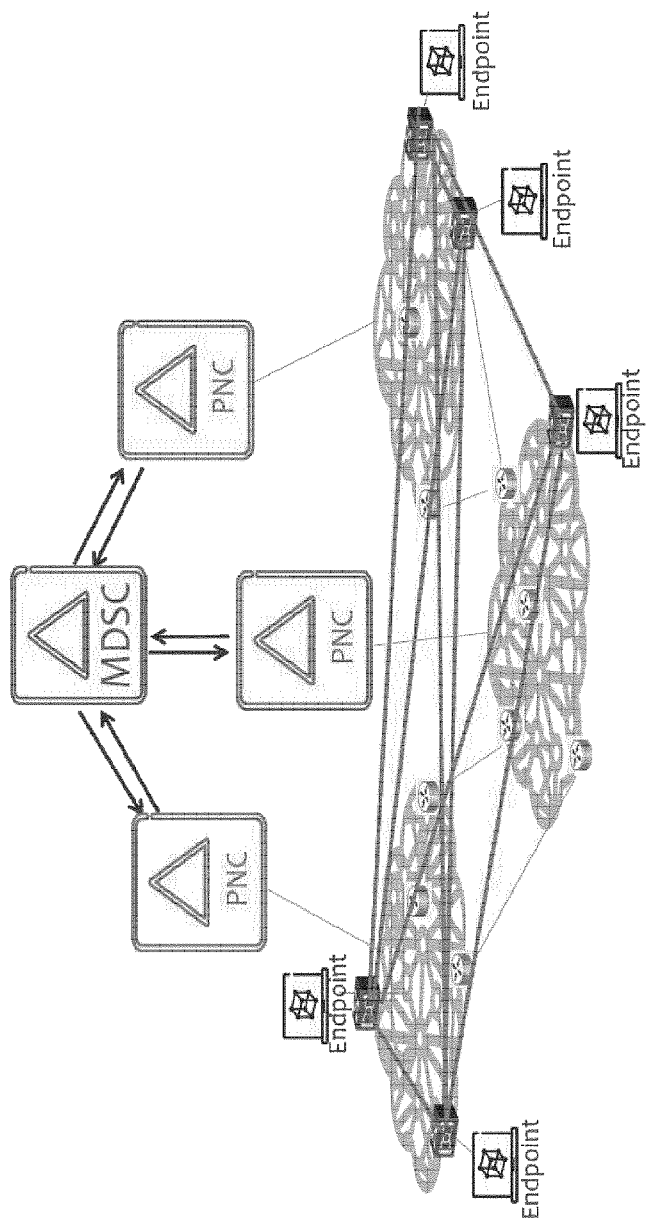
FIG. 1D is a schematic diagram of a network in accordance with an aspect of an embodiment.
Figure 1E:
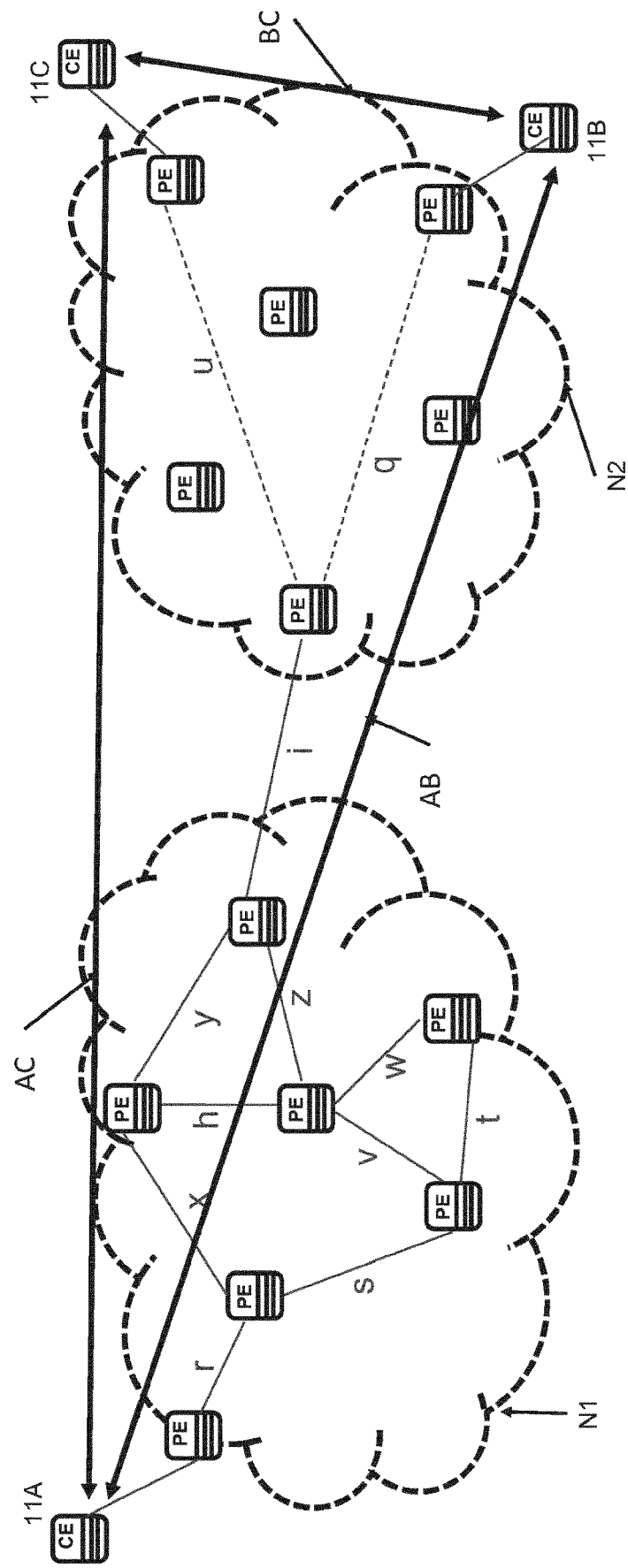
FIG. 1E is a schematic diagram of a network in accordance with an aspect of an embodiment.

FIG. 1E shows the network diagram of FIG. 1B, with the routes between the endpoints AA, AB and AC (as discussed above with reference to FIG. 1A) also shown. Using the steps of the method of FIG. 1C, criticality values can be determined for the physical resources. Based on the topology of the network, links i and r and the respective PEs at the termini of these links would be likely to have high criticality values, as all of the data traffic using routes AB and AC would necessarily use these routes. By contrast, links t and w would have low traffic and therefore likely lower criticality values.

When criticality values have been obtained for at least some of the physical resources of the network, the data traffic in the network can then be controlled on the basis of the criticality values, as shown in step S104 of FIG. 1C. In an aspect of an embodiment, the control of the data traffic may comprise routing or rerouting data traffic using routes determined based on the calculated criticality values, suspending some data transfer services (that is, not sending the data traffic for these data transfer services), and so on. Further features which may be present in some aspects of embodiments are discussed in greater detail below. With reference to the example network shown in FIG. 1A (as discussed above), control of data traffic based on criticality values could result in data traffic between endpoints 11A and 11C being split between routes AC and AB-BC. Splitting the data traffic in this way may reduce the criticality values of physical resources used on route AC relative to a situation wherein all the data traffic for data transfer services between endpoints 11A and 11C was sent using route AC.

The criticality value or values of a given physical resource are dependent on the priority levels of the data traffic that is transferred via the given physical resource. The topology information for the network is also taken into consideration. As an example of the use of the topology information, where there is only one path between two endpoints that could be used to transfer data traffic, the physical components forming that path would have higher criticality values than if an alternative path between the two endpoints were also present, all else being equal.

In some aspects of embodiments, the criticality values are calculated using other characteristics of the physical resources in addition to the priority levels of the data transfer services for which data traffic is transferred via the given physical resources. An example of an other characteristic which may be used in the critical value calculation is the reliability of the physical resources. A reliability value for a given physical resource may be determined using information such as the mean time to failure (MTTF) for physical resources of the type of the given physical resource, that is, how long does an average component of the type of the given physical resource typically operate correctly before a fault develops. Using information such as the MTTF, a probability of a fault developing in a given time period can be determined. Other information which may additionally or alternatively be used in calculating the criticality values includes repair values which may be determined using information such as the mean time to repair (MTTR) for the given physical component. This is largely determined by the type and location of the physical resource; a physical resource which is a standard component, such as a server unit, is likely to have a lower MTTR and thereby a higher repair value than a more unusual component, such as a custom interface for a particular user. Also, a component in an easy to access location such as a data transfer centre in a large city is likely to have a lower MTTR and thereby a higher repair value than a more difficult to access component such as a deep sea cable or a satellite. Further information may also be used when determining a reliability value of a component, such as the length of time the component has been in operation or the intensity of the use to which the component is subjected. Thus, the criticality value may be calculated using a mean time to failure and/or a mean time to repair of the physical resources.

Where reliability values and/or repair values are determined for physical resources, typically the criticality values for the physical resources are inversely proportional to the reliability values and/or repair values. That is, the higher the reliability value and/or repair value of a given physical component is/are, the less likely to fail the given physical component is and the easier to repair the given physical component is determined to be and therefore the lower the criticality value of the given component will be. In aspects of embodiment wherein reliability values and/or repair values are used in this way, the control of the data traffic based on the calculated criticality values would therefore generally result in higher priority data traffic being weighted towards (e.g. transferred or set-up, if possible), using routes having more reliable/easier to repair components (and a lower fault probability), and avoiding using components deemed unreliable and/or difficult to repair.

In an aspect of an embodiment, the step of controlling the data traffic may comprise calculating a total of criticality values for all of the physical resources in the network, as shown in step S301 of FIG. 3. Various options for routing or rerouting (referred to hereinafter as rerouting for convenience) data traffic may then be evaluated, for example by simulating the results of rerouting the data traffic or calculating new criticality values for the physical resources under the assumption that the data traffic is moved, or alternatively by actually rerouting the data traffic and recalculating the criticality values. The purpose of evaluation the different rerouting options is to determine if rerouting some of the data traffic would result in a reduction in the sum of criticality values for the network. Once the various rerouting options have been evaluated, data traffic may be rerouted to reduce (and ideally minimise) the total of criticality values for the plurality of physical resources (see step S302). By reducing the total of criticality values for the plurality of physical resources in the network, the susceptibility of the network to data traffic interruptions (including delays in transferring data traffic and loss of data), and also the severity of consequences if an interruption does occur, may be reduced.

In addition or alternatively to seeking to reduce or minimise a total of criticality values, aspects of embodiments may be configured such that the individual criticality values for the physical resources may be reduced or minimised. The criticality values for individual physical resources may be reduced by dispersing data traffic across a plurality of routes rather than, for example, concentrating a large amount of the data traffic along a single route. The dangers of concentrating data traffic include bottlenecks developing that delay data traffic, and also the loss of a large amount of data traffic if a component on the route used for the concentration fails.

If a given amount of data traffic is to be carried using a given network of physical resources, it is unlikely to be possible to simultaneously reduce the criticality values for all of the physical components (without modifying the physical structure of the network by, for example, adding more physical resources). Therefore, in aspects of embodiments wherein the individual physical resource criticality values are used, a predetermined criticality threshold may be set. The thresholds are set for each network, with reference to the specific configuration and operations situation of the network. Either a single universal criticality threshold may be set for all types of physical resources (and the criticality values for the physical resources determined with reference to the universal threshold), or different criticality thresholds for different physical resource types may be used. The step of controlling data traffic based on the calculated criticality values may then comprise routing or rerouting data traffic such that none of the criticality values of the physical resources exceeds the respective threshold. As an example of this, and with reference to the example network in FIG. 1E,
based on traffic engineering metrics alone it is likely that data traffic for routes AB and AC would be transferred using the physical resources forming links x and y, which would therefore have high criticality values. In order to reduce the criticality values of the link x and y physical resources, some or all of the data traffic could be routed or rerouted using an alternative route, for example, using the physical resources forming links s, v, t, w and z.

As discussed above, the criticality values of the physical resources may be calculated using information including the reliability and/or ease of repair of the physical resources. In aspects of embodiments, the control of the data traffic based on the criticality values may comprise determining maintenance priorities for the physical resources based on the criticality values. The use of the criticality values to prioritise maintenance may be performed in situations wherein the criticality values do not take into account the reliability and/or ease of repair of the physical resources; in such situations the higher criticality value physical resources are generally determined to warrant more frequent maintenance based on the fact that higher priority data traffic passes through these physical resources. However, the determination of maintenance priorities using the criticality values is particularly effective in situations wherein the reliability values and/or repair values of the physical resources are used in determining the respective criticality values, because this allows completed maintenance to more easily be taken into consideration when controlling data traffic. By servicing/replacing a physical resource, the fault probability of that physical resource can be significantly reduced and thereby an associated criticality value of the physical resource reduced.

In addition to determining maintenance priority for physical resources based on the calculated criticality values, as discussed above, the step of controlling the data traffic may further comprise simulating failure events for physical resources, as shown in FIG. 4, step S401. Using the network topology information, the effect of failure of one or more physical resources may be simulated. The physical resources for which failure is simulated may be selected at random, or may be selected as the physical resources having high current criticality values, or may be selected as the physical resources deemed likeliest to fail (so, the physical resources having low reliability values) or may be determined in another way. The effect of the failure of the one or more of the physical resources on the criticality values of the remaining physical resources is then determined (see FIG. 4, step S402), that is, variations in the criticality values of the remaining physical resources which would result from the failure of the one or more physical resources are calculated. As an example of this, if three routes exist between two endpoints, and failures are simulated in physical resources used for two of the routes, this would cause the simulated (calculated) criticality values of the physical resources on the remaining route to significantly increase. The concurrent failures (either beginning simultaneously or in succession) of any number of the physical resources forming the network may be simulated; for example the concurrent failure of at least two of the physical resources may be simulated. The usefulness of simulation decreases with the increase in the number of concurrent failures being simulated, because the likelihood of all of the simulated failures actually occurring concurrently becomes low. However, in order to more effectively prioritise maintenance, several simulations may be performed where the failures of different physical resources are simulated.

Based on the results of the simulation (that is, the calculated variations in the criticality values), the maintenance priorities of the physical resources may be determined, as shown in step S403 of FIG. 4. This determination may include increasing or reducing the maintenance priority of the physical resources for which failure was simulated and/or the physical resources having simulated criticality values which substantially increased following the simulated failure of other physical resources.

The results of the simulation can also be useful in the event that one or more physical resources do fail. In the event of one or more physical resource failures, data traffic may be rerouted in a way designed to minimise the increases in criticality values for the remaining physical resources. This is shown in FIG. 5, specifically in step S501. As discussed above, different data transfer services may have different priority levels; accordingly some data traffic is likely to be higher priority than other data traffic. In the event that the rerouting of data traffic while maintaining all data traffic following the failure of one or more physical resources would result in extended delays or potential data loss for higher priority data traffic, or in unacceptably high criticality values for some physical resources, the rerouting may comprise interrupting some data traffic, for example, interrupting data traffic for one or more data transfer services (see step S502), essentially suspending one or more data transfer services. Typically the data traffic to be interrupted would be selected as the lowest priority data traffic, but the selection may be made depending upon which data traffic would provide the greatest benefit to the remainder of the data traffic if interrupted. The interrupted data traffic could then be reinstated, for example, when the failed physical resource or resources are repaired or replaced.

Figure 6:
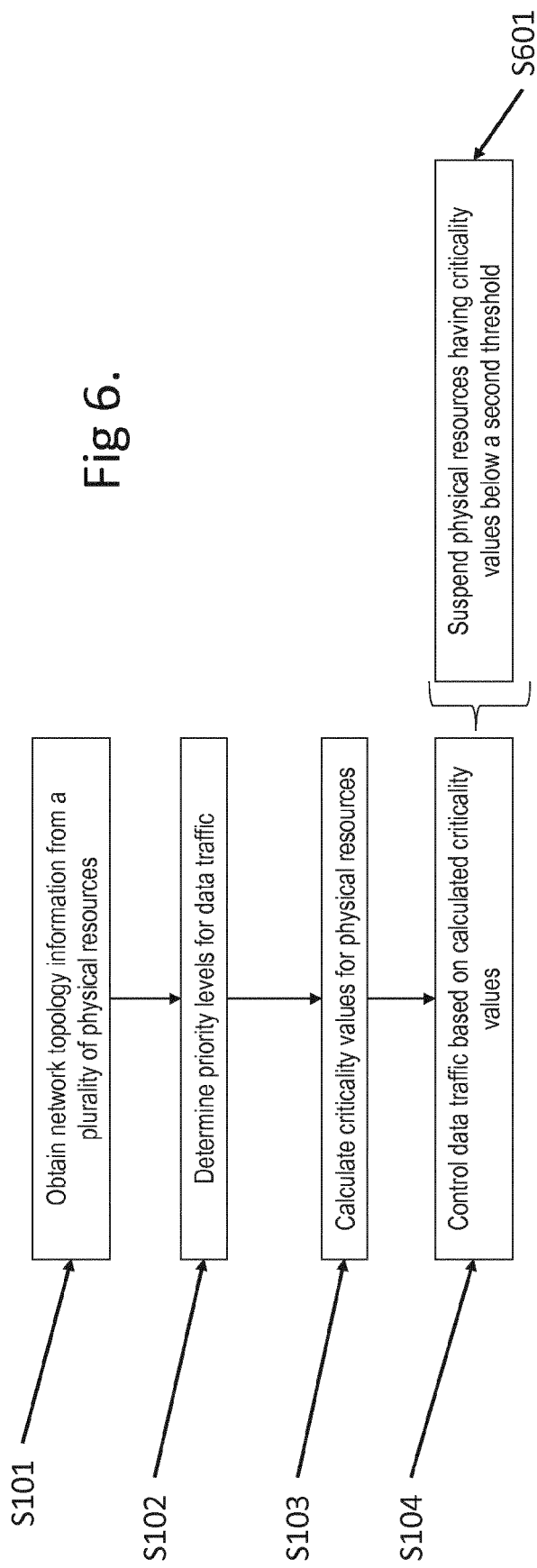
FIG. 6 is a flowchart illustrating a further method in accordance with an aspect of an embodiment.

In addition or alternatively to interrupting data traffic during rerouting following the failure of one or more physical resources (as discussed above) aspects of embodiments may be further configured to suspend one or more physical resources. The step of controlling the data traffic based on the calculated criticality values may therefore comprise suspending physical resources having a criticality value below a predetermined threshold (also referred to as the "second threshold"). This is shown in FIG. 6, step S601. Physical resources may be suspended if they are not currently required for the efficient functioning of the network, for example, if they are not currently used for data traffic. If a given physical resource is not used for sending data traffic, or if the physical resource is one of several options which may be used for sending data traffic between two endpoints, this would typically result in the given physical resource having a low criticality value. Therefore, determining which physical resources should be suspended using the criticality values is an effective way of improving the efficiency of the network. If the physical resources are subsequently required due to an increase in data traffic, failure of one or more other physical resources, or another reason, then the physical resources may be reactivated.

Figure 7:
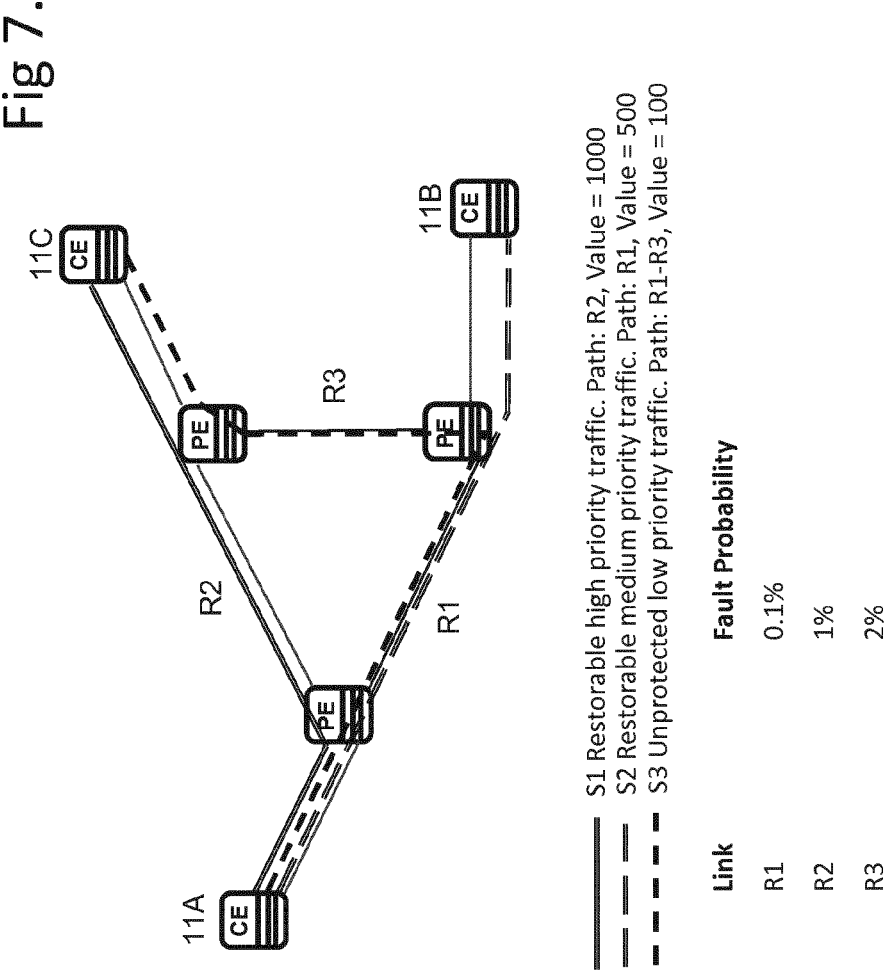
FIG. 7 is a schematic diagram of a network in accordance with an aspect of an embodiment.

FIG. 7 is a schematic diagram of a simple network, which can be used to understand how the simulation of faults may be undertaken. The network shown in FIG. 7 comprises three endpoints 11A, 11B and 11C, and has the same basic structure as the network shown in FIG. 1A. Each of the endpoints 11A, 11B and 11C is an interface with a customer network, that is, a customer edge. The network also comprises three nodes, or provider edges, linked by routes (using further physical resources which are not shown). The routes between the nodes are shown in the diagram as R1, R2 and R3. In the current configuration, the network is used to carry data traffic for three data transfer services S1, S2 and S3. The routes used for the data traffic for S1, S2 and S3 are indicated in FIG. 7 by a double solid line, a double dashed line and a single dashed line respectively. S1 is a data service between endpoints 11A and 11C, and uses route R2. S2 is a data service between endpoints 11A and 11B, and uses route R1. S3 is a data service between endpoints 11A and 11C (like S1), and uses route R1-R3.

Using reliability information as discussed above (such as the MTTF), the fault probability for routes R1, R2 and R3 is determined as shown in the table of FIG. 7. As shown in the table, R1 is the most reliable route and R3 is the least reliable route. S1 and S3 are data services between the same two endpoints (11A and 11C), but to avoid the criticality values of the components in route R2 becoming too high, the S3 data traffic has been controlled to use route R1-R3. The S3 data traffic has been routed by the less reliable of the two routes because it is lower priority than the S1 data traffic; in this way the criticality values of the physical resources in the network are minimised.

As discussed above, the control of the data traffic may comprise rerouting data traffic following the failure of one or more physical resources, and may also comprise suspending data services (interrupting data traffic). In the FIG. 7 example, service S1 is a high priority service (with a nominal value used in physical resource criticality value calculations of 1000), S2 is a medium priority service (with a nominal value used in physical resource criticality value calculations of 500), and S3 is a low priority service (with a nominal value used in physical resource criticality value calculations of 100). As such, in the present example, services S1 and S2 are protected and restorable (rerouted) in the event of a physical resource failure interrupting the flow of data traffic. By contrast, S3 is not protected and, if data traffic for this service is interrupted, the data traffic is lost (not rerouted).

Figure 8:
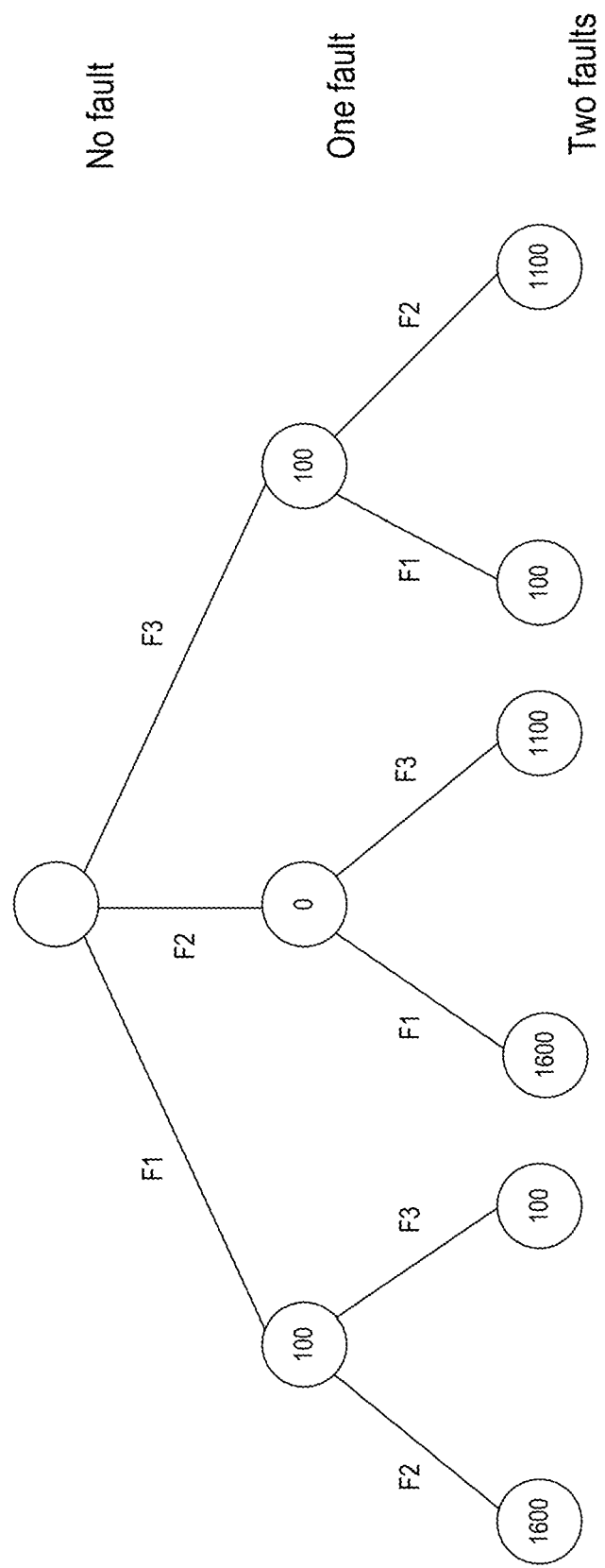
FIG. 8 is a tree diagram illustrating the results of fault simulation for the network of FIG. 7.

FIG. 8 shows the results of simulating faults in the network of FIG. 7. The information is shown in a three level tree diagram. As indicated in FIG. 8, the root of the tree (at the top of the diagram) indicates the situation wherein none of the routes R1, R2 or R3 has been interrupted by a simulated fault in a physical resource. The middle level shows a simulated failure in a physical resource in one route, and the bottom level shows a simulated failure in physical resources in two routes. The situation wherein there is a simulated failure in all three routes is not shown; at this point there would be no functioning routes.

In the FIG. 8 diagram the Fx numbers indicate a fault in the respective numbered route x, so F1 indicates a fault in route R1, and so on. The numbers in the circles at each level shown the cumulative nominal value of the data traffic lost following the indicated failures, referred to as data lost value. The data lost values take into account that services S1 and S2 may be rerouted if possible, but S3 is not rerouted. In the present example, it is assumed that there is sufficient capacity to reroute services. As an example, following the F1 route to the first level shows that the cumulative nominal value of the data traffic lost following a failure in R1 would be 100; this value is due to the loss of the S3 data traffic, which is not rerouted. The S2 data traffic previously also used the R1 route, but could be rerouted to use R2-R3, and therefore would not be lost.

Using the data lost values shown in FIG. 8, the values of the routes R1, R2 and R3 can be determined; these values are indicated in the figure as V1, V2 and V3. The route values are determined by multiplying the data lost values by the fault probability values from FIG. 7. Taking the example of V1 (the value of R1), this is determined as:

(The probability of R1 alone failing)×(The data lost value for R1 alone failing)+(The probability of R1 and R2 failing)×(The data lost value for R1 and R2 failing)+(The probability of R1 and R3 failing)×(The data lost value for R1 and R3 failing)

That is: $((0.001)\times(100))+((0.001\times0.01)\times(1600))+((0.001\times0.02)\times(600))=0.128$ Performing equivalent calculations for the other routes shows that the route value V2 is 0.236, and V3 is 2.232. As such, maintenance could be scheduled to reduce the criticality value of the physical components on R3, by reducing the fault probability.

An alternative measure of route value may also be used, based on the amount of data traffic that would be lost or that would require rerouting in the event of a route failing multiplied by the probability of failure. Using this alternative measure, the values of the routes would be obtained by multiplying the probability of a failure on the route by the total value of the data on the route. With reference to the example shown in FIG. 7, the value of R1 using this alternative measure (AV1) would be:

(The probability of R1 alone failing)×(The data lost or rerouted for R1 alone failing)×(The probability of R1 and R2 failing)×(The data lost or rerouted for R1 and R2 failing)×(The probability of R1 and R3 failing)×(The data lost or rerouted for R1 and R3 failing)

That is: $AV1=((0.001)\times(100))\times((0.001\times0.01)\times(1600))\times((0.001\times0.02)\times(600))=0.0000192$ Either measure, or other alternative measures, may be used to determine route value. Maintenance may then be scheduled accordingly.

Figure 9:
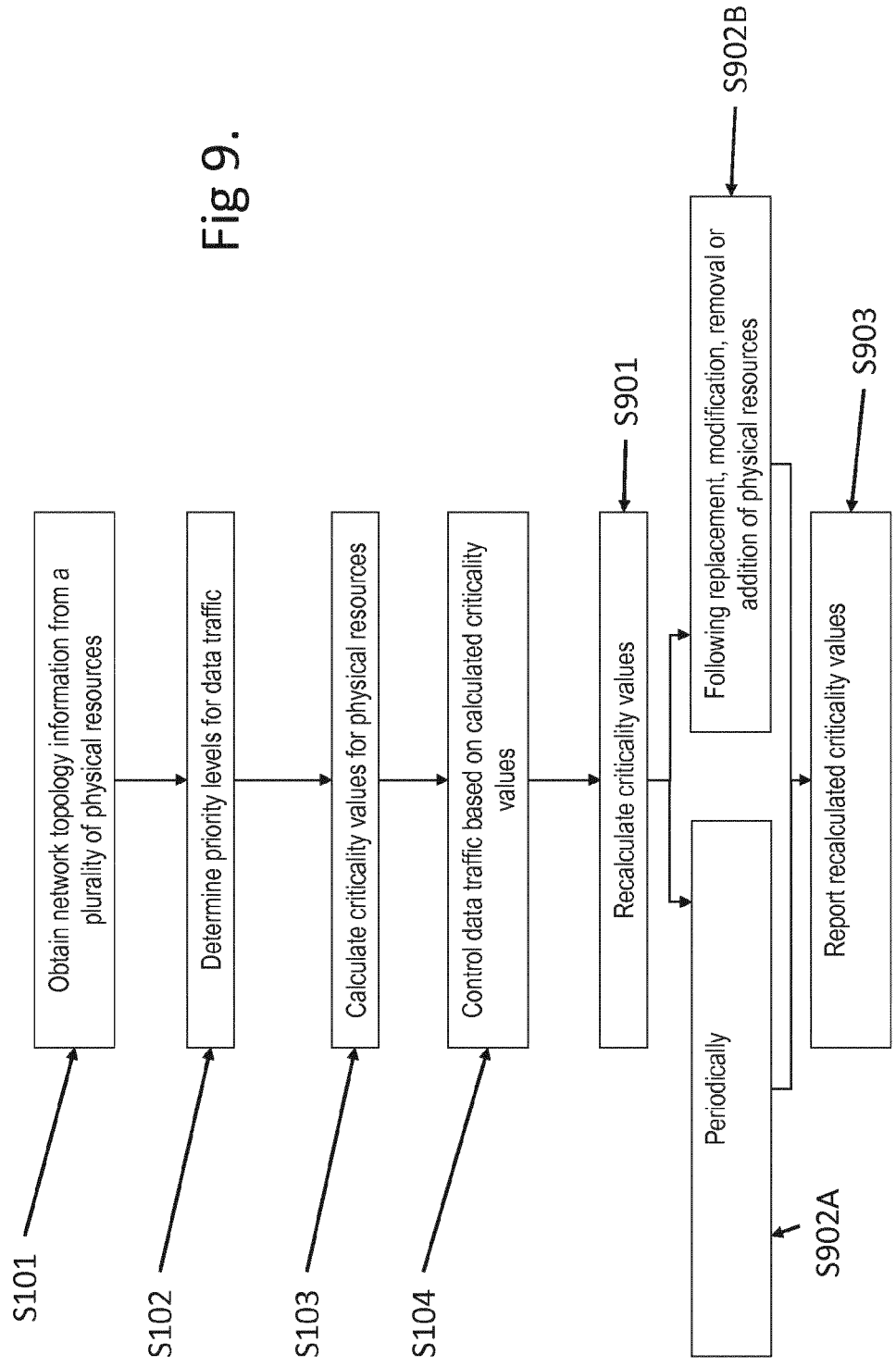
FIG. 9 is a flowchart illustrating a further method in accordance with an aspect of an embodiment.

Due to the flexible nature of modern network provisioning, the data traffic loads placed on networks are rarely static, but instead vary frequently. New data transfer services may be activated, and existing data transfer services may have increasing or decreasing data traffic demands, or may be altered to operate between different endpoints, or may cease to operate entirely. As such, typically data criticality values upon which data traffic within a network may be controlled may become inaccurate (or out of date) as the demands on the network evolve. Therefore, in some aspects of embodiments, the criticality values of the physical resources may be recalculated following the initial calculation and control of the data traffic. This is illustrated in FIG. 9 (see step S901). Following the recalculation of the criticality values, the data traffic may then be controlled (e.g. control of routing of data traffic) based on the recalculated values, where the control can encompass any combination of the options discussed above.

In aspects of embodiments, the recalculation of the criticality values may take place periodically, for example, with a certain time frequency. This is shown in step S902A. The term "periodically" in this context incorporates scheduling recalculation with the transfer of a certain amount of data in addition to purely chronological periodicity. Additionally or alternatively, aspects of embodiments may be configured such that the criticality values are recalculated when the physical resources are altered in some way (see step S902B), for example, following replacement, modification, removal or addition of physical resources. In this way, alterations in the capabilities of the physical resources and of the network as a whole may swiftly be taken into account when controlling data traffic. In some aspects of embodiments the criticality values may be periodically recalculated, and also recalculated upon alteration of the physical resources. That is, a further recalculation in addition to the periodically scheduled recalculations may be performed following physical resource alteration. In this way, the data traffic may be controlled to best make use of the current network configuration.

When the criticality values of the physical resources have been calculated or recalculated, the criticality values may be reported, as shown in step S903. The criticality values may all be reported, or simply a sum for the network or other summary information may be reported. The reports may be useful for monitoring trends in the criticality values over time, which may be helpful in predicting when network maintenance or modifications may be necessary. The criticality values may be reported for review by a network supervisor, which may be one or more human supervisors, computer implemented supervisors (using, for example, trained neural networks), or any suitable supervisory system. Although the criticality values (or summary values) may be reported shortly after calculation, it is also possible to cache the criticality values (or summary values) so that multiple cached values may be reported together at a convenient time. As an example, of this, the criticality values from a day or week of operation may all be reported during a low traffic period, such as overnight or on a weekend day respectively.

In addition to controlling data traffic based on calculated criticality values for physical components, aspects of embodiments may be configured to take into consideration quality of service metrics. That is, the determination as to how to route data traffic through the network may be based on a combination of the calculated criticality values and quality of service constraints such as lag, number of hops, and so on, which may also be calculated.

Figure 10:
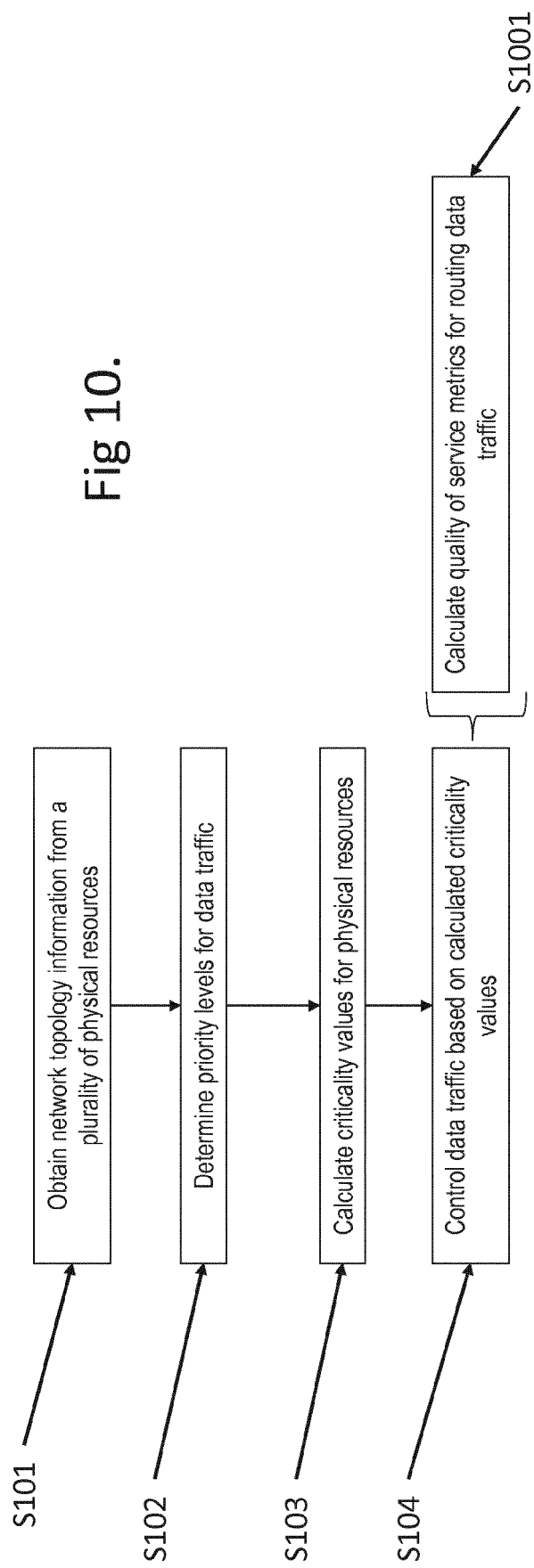
FIG. 10 is a flowchart illustrating a further method in accordance with an aspect of an embodiment.

This is shown in FIG. 10, specifically in step S1001. Where a combination of quality of service and criticality values are used to control data traffic, the risks of data delay or loss due to physical resource failure are balanced against the need to satisfy the requirements of data transfer services.

It will be understood that the detailed examples outlined above are merely examples. According to embodiments herein, the steps may be presented in a different order to that described herein. Furthermore, additional steps may be incorporated in the method that are not explicitly recited above.

The invention claimed is:

1. A method for data traffic control in a network, the method comprising:
    obtaining network topology information from a plurality of physical resources used to transfer data traffic in the network;
    determining priority levels for data traffic in the network;
    using the network topology information and the determined priority levels to calculate criticality values for physical resources from among the plurality of physical resources, the criticality values for the physical resources indicating the relative importance of the physical resources in the network; and
    controlling the data traffic in the network to minimize at least one calculated criticality value of a sum of the calculated criticality values.

2. The method of claim 1, wherein the step of controlling the data traffic comprises:
    calculating a total of the criticality values for the plurality of physical resources; and one of routing and rerouting data traffic based on the total of the criticality values for the plurality of physical resources.

3. The method of claim 1, wherein the step of controlling the data traffic comprises one of routing and rerouting data traffic such that none of the criticality values exceed a first predetermined threshold.

4. The method of claim 1, wherein the criticality value for a given physical resource is calculated using at least one a reliability value and a repair value of the given physical resource.

5. The method of claim 1, wherein the criticality value for a given physical resource from among the plurality of physical resources is used to determine a maintenance priority of the given physical resource.

6. The method of claim 5, further comprising simulating one or more failures of physical resources from among the plurality of physical resources, and determining any variation in the criticality values of the other physical resources from among the plurality of physical resources due to the simulated failures, wherein the variation in the criticality values is used when determining the maintenance priority of at least one of the physical resources from among the plurality of physical resources.

7. The method of claim 6, wherein at least two concurrent failures of physical resources are simulated.

8. The method of claim 1, wherein the step of controlling the data traffic comprises suspending physical resources from among the plurality of physical resources having a criticality value below a second predetermined threshold.

9. The method of claim 1 further comprising, in the event of a failure of one or more of the plural physical resources, rerouting data traffic using other physical resources while minimising a total of the criticality values for the plural physical resources except for the one or more failed physical resources.

10. The method of claim 1, wherein the network is a software defined network.

11. A network criticality manager configured to control data traffic in a network, the network criticality manager comprising:
  processing circuitry, the processing circuitry being configured to:
    obtain network topology information from a plurality of physical resources used to transfer data traffic in the network;
    determine priority levels data traffic in the network;
    calculate criticality values for physical resources from among the plurality of physical resources using the network topology information and the determined priority levels, the criticality values for the physical resources indicate indicating the relative importance of the physical resources in the network; and
    control the data traffic in the network to minimize at least one calculated criticality value or a sum of the calculated criticality values.

12. The network criticality manager of claim 11, configured, when controlling the data traffic, to:
  calculate a total of the criticality values for the plurality of physical resources; and
  one of route and reroute data traffic based on the total of the criticality values for the plurality of physical resources.

13. The network criticality manager of claim 11 configured, when controlling the data traffic, to one of route and reroute data traffic such that none of the criticality values exceed a first predetermined threshold.

14. The network criticality manager of claim 11, configured to calculate the criticality value for a given physical resource using at least one of a reliability value and a repair value of the given physical resource.

15. The network criticality manager of claim 11, configured to use the criticality value for a given physical resource from among the plurality of physical resources to determine a maintenance priority of the given physical resource.

16. The network criticality manager of claim 15, configured:
  to simulate one or more failures of physical resources from among the plurality of physical resources; and
  to determine any variation in the criticality values of the other physical resources from among the plurality of physical resources due to the simulated failures, wherein the network criticality manager is further configured to use the variation in the criticality values when determining the maintenance priority of at least one of the physical resources from among the plurality of physical resources.

17. The network criticality manager of claim 16, configured to simulate at least two concurrent failures of physical resources.

18. The network criticality manager of any of claim 11, configured, when controlling the data traffic, to suspend physical resources from among the plurality of physical resources having a criticality value below a second predetermined threshold.

19. The network criticality manager of claim 11, configured to recalculate the criticality values following at least one of the replacement, modification and removal of one of the plurality of physical resources, and the addition of new physical resources.

20. The network criticality manager of claim 11, configured to calculate quality of service metrics for routing the data traffic, and to control the data traffic in the network based on a combination of the calculated criticality values and the quality of service metrics.

* * * * *